United States Patent [19]

Mashimo

[11] Patent Number: 5,177,727
[45] Date of Patent: Jan. 5, 1993

[54] ROTARY RECORDING MEDIUM HAVING A GUIDE TRACK AND RECORDING AND REPRODUCING APPARATUS THEREFOR

[75] Inventor: Akira Mashimo, Tokorozawa, Japan

[73] Assignee: TEAC Corporation, Japan

[21] Appl. No.: 514,423

[22] Filed: Apr. 25, 1990

[30] Foreign Application Priority Data

Apr. 27, 1989 [JP] Japan .................................. 1-112922

[51] Int. Cl.$^5$ ........................... G11B 7/00; G11B 3/70
[52] U.S. Cl. ............................... 369/44.37; 369/275.3
[58] Field of Search ............... 369/275.1, 275.3, 44.13, 369/277, 278, 32, 44.26, 44.32, 44.37

[56] References Cited

U.S. PATENT DOCUMENTS

| | | | |
|---|---|---|---|
| 3,190,971 | 6/1965 | Lowell | 369/277 |
| 3,931,460 | 6/1976 | Watson | 369/275.3 |
| 4,018,448 | 4/1977 | Di Matto | 369/275.3 |
| 4,223,347 | 9/1980 | Bauwhuis et al. | 369/44.13 |
| 4,392,219 | 7/1983 | Yokozawa et al. | 369/44.13 |
| 4,712,204 | 12/1987 | Takemura et al. | 369/275.3 |
| 4,870,508 | 9/1989 | Van Rosmalen et al. | 369/275.1 |
| 5,023,856 | 6/1991 | Raaymakers et al. | 369/44.13 |

FOREIGN PATENT DOCUMENTS 9101551  6/1991  Fed. Rep. of Germany ... 369/44.13

OTHER PUBLICATIONS

"Optical Disc Technology" (Ogami et al., Feb. 10, 1989 Rajio Gijutsusha Inc., pp. 85-97) discloses various procedures for detecting tracking error.

Primary Examiner—Roy N. Envall, Jr.
Assistant Examiner—Nabil Hindi
Attorney, Agent, or Firm—Andrus, Sceales, Starke & Sawall

[57] ABSTRACT

An optical disk includes a recording surface and a guide track which is a groove formed on the recording surface, and the edge lines of the groove has a wave shape that changes cyclically in a direction of a radius. An optical disk apparatus includes a first laser, a second laser, a first and second optical sensors which detect the reflected beams obtained by reflecting the light beams from the first and second lasers on the recording surface. The optical disk also includes first and second signal extraction circuits extracting signals having a frequency component corresponding to the wave shape of the edge line of the groove from the detection signals from the first and second optical sensors, a tracking controller controlling positions in a direction of the radius of the first and second lasers on the basis of the signals from the first and second extraction circuits, and a recording and reproducing unit for recording and reproducing on and from the optical disk.

7 Claims, 4 Drawing Sheets

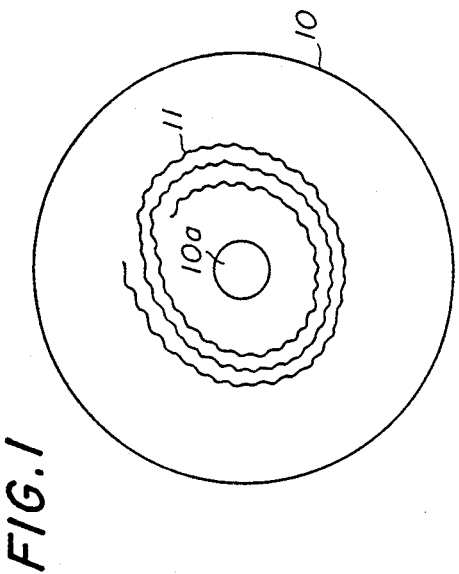
FIG. 1
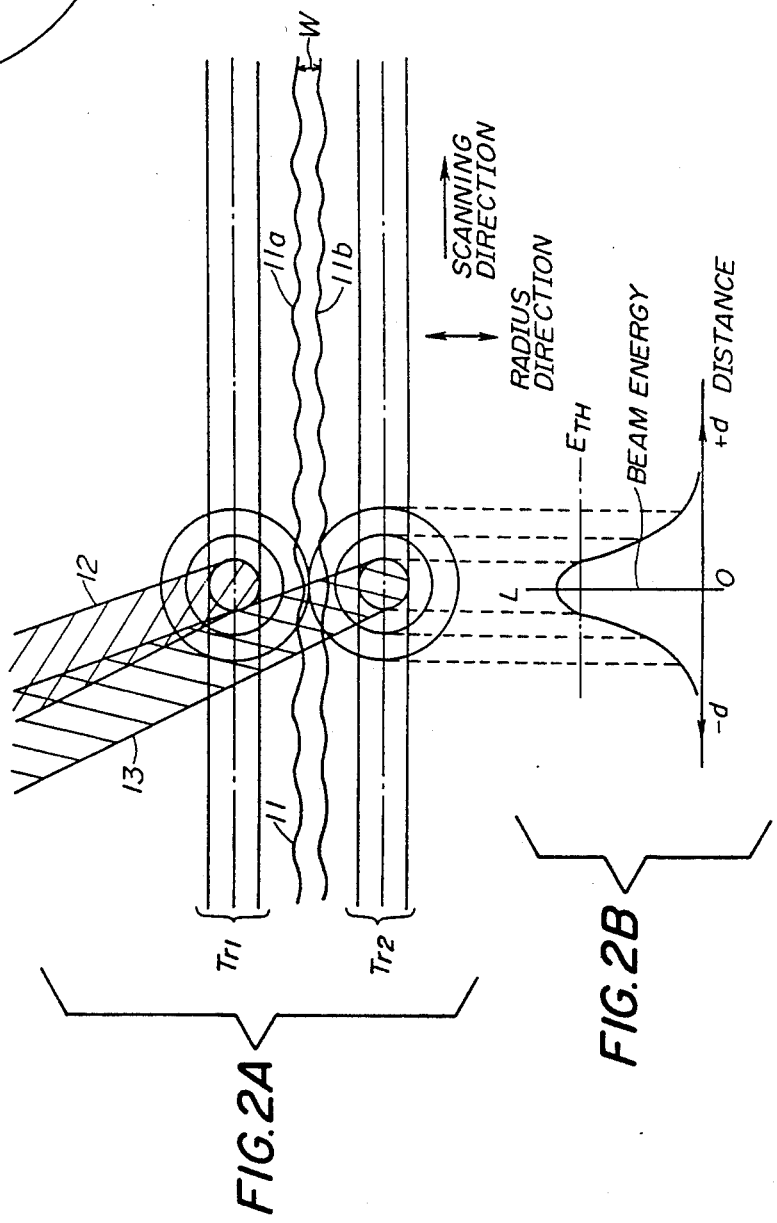
FIG. 2A
FIG. 2B

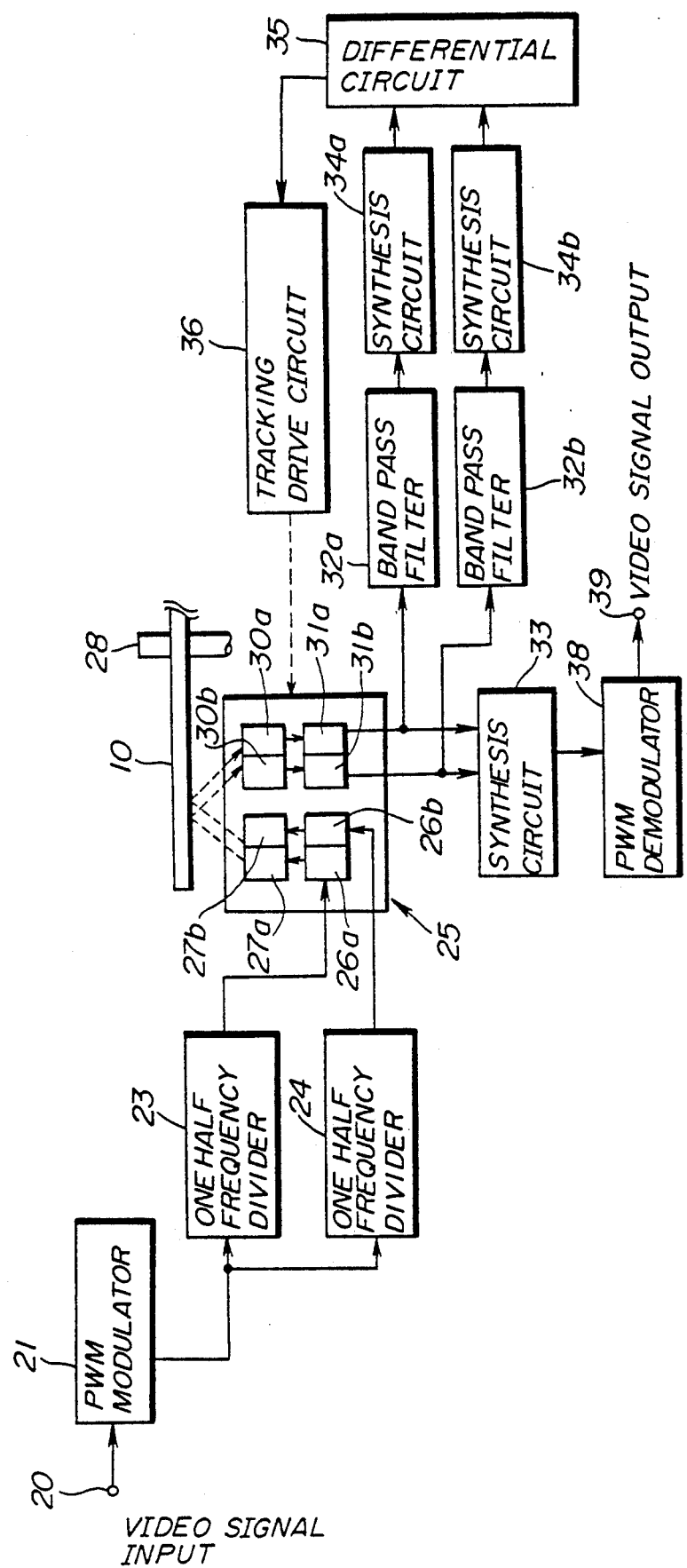

FIG. 5A
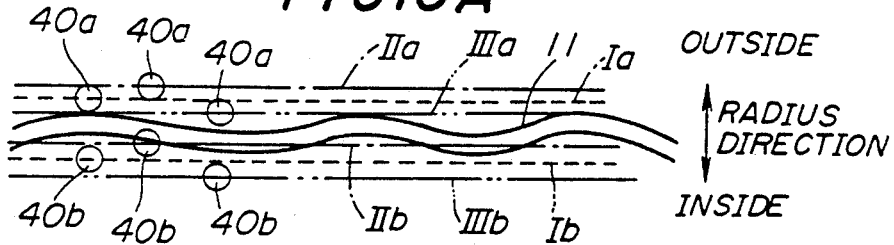
FIG. 5B
FIG. 6A
FIG. 6B
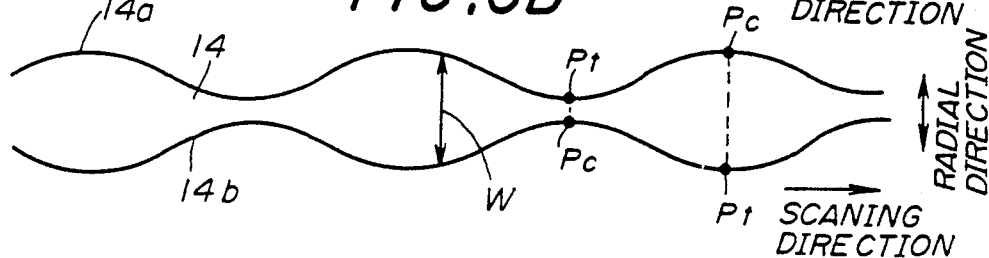

ROTARY RECORDING MEDIUM HAVING A GUIDE TRACK AND RECORDING AND REPRODUCING APPARATUS THEREFOR

BACKGROUND OF THE INVENTION

The present invention relates to a rotary recording medium having a guide track and recording and reproducing apparatus which records and reproduce information on and from the rotary recording medium.

Conventionally proposed are optical disk apparatus that perform the recording of information by forming pits by irradiating a laser beam to a rotating rotary recording medium (hereinafter referred to an optical disk), and that perform reproduction of information by irradiating the optical disk with a laser beam and using the reflected light to detect the presence or absence of pits.

In the conventional optical disk, a guide track is formed on a recording surface thereof. The guide track has one of a concentric shape and spiral shape with the center of rotation of the optical disk as the center. This guide track, for example, is constituted by a continuous groove (hereinafter referred to a guide groove) having a predetermined depth. Then, a spot of a main laser beam and the spots of two sub laser beams on either side are arranged in the direction of the radius of the optical disk and tracking control is performed so that the two sub laser beams scan end portions of the guide groove. Accordingly, when information is recorded the main laser beam accurately scans between the adjacent guide track turns and a recording track where information is recorded is formed. When information is reproduced, as in the case of the recording, sub laser beams are guided by the guide grooves and so the main beam accurately scans on the recording track.

The inventor of the invention of the present application has proposed, in U.S. patent application Ser. No. 426,789, a information signal recording and reproduction apparatus that enables the recording and reproduction of high density information by performing the recording and reproduction of two tracks at the same time as the two main laser beams.

However, in an apparatus that performs the recording and reproduction of two tracks simultaneously as described above, if tracking control is performed by providing two sub laser beams for the main laser beam as in the case of conventional apparatus, it is necessary to provide six laser beams. Accordingly, the optical pickup that includes the light source for the laser beams becomes large.

SUMMARY OF THE INVENTION

Accordingly, the general object of the present invention is to provide novel and useful rotary recording medium having a guide track and recording and reproducing apparatus therefore that is novel and in which the disadvantages of the aforementioned prior art are eliminated.

In the light of the problems described earlier, a more detailed objective of the present invention is to provide a rotary recording medium that can record and reproduce two tracks with two laser beams, and a recording and reproducing apparatus therefore, that is compact and which has a simple configuration for the optical pickup.

The above objects of the present invention are achieved by a rotary recording medium comprising a recording surface upon which information is recorded, and a guide track which is a groove formed on the recording surface and having one of a spiral shape and a concentric shape, both edge lines of the groove having a wave shape that changes cyclically in a direction of a radius, and two recording tracks being formed adjacent to both the edge lines of the guide track when information is recorded, and by a recording and reproducing apparatus for recording and reproducing information on and from the rotary recording medium comprising a first light source irradiating a light beam to the recording surface so that the center of a spot is positioned to one side of the groove in the guide track, a second light source irradiating a light beam to the recording surface so that the center of a spot is positioned to another side of the groove in the guide track, first photoelectric conversion means for receiving a first reflected beam obtained by reflecting the light beam from the first light source on the recording surface and outputting a first signal corresponding to the first reflected beam, second photoelectric conversion means for receiving a second reflected beam obtained by reflecting the light beam from the second light source on the recording surface and outputting a second signal corresponding to the second reflected beam, first signal extraction means for extracting, from the first signal, a signal having a frequency component corresponding to the wave shape of one of both the lines of the groove, second signal extraction means for extracting from the second signal a signal having a frequency component corresponding to the waveform shape of the other edge line of the groove, tracking means for control a position in a direction of the radius, of the first and second light sources so that a central portion of spots of light beams from the first and second light sources is positioned on recording tracks formed on both sides of the guide track, on the basis of each of the signals extracted by the first and second signal extraction means, and means for forming the recording tracks for the information on both sides of the guide track at a time of a recording and for reproducing the recorded information from the recording tracks at a time of a reproduction.

According to a rotary recording medium and a recording and reproducing apparatus according to the present invention, two light beams are used to enable the recording and reproduction of two tracks simultaneously, while performing control of the tracking. Accordingly, the present invention has a simple configuration for the optical pickup, is compact and is extremely effective.

Other objects and further features of the present invention will be apparent from the following detailed discription when read in conjunction with the accompanying drawings.

BRIEF DESCRIPTION OF THE DRAWINGS

FIG. 1 is a plan view of a first embodiment of an optical disk according to the present invention;

FIGS. 2A and 2B are a view for describing a guide groove;

FIG. 3 is a block diagram indicating an embodiment of an optical disk apparatus according to the present invention;

FIGS. 5A and 5B are views indicating the relationship between the signal output from a band pass filter and the position of the beam spot;

FIGS. 6A and 6B are views indicating an variation for the guide grooves.

DESCRIPTION OF THE PREFERRED EMBODIMENTS

Figures 4A, 4B, 4C, 4D:
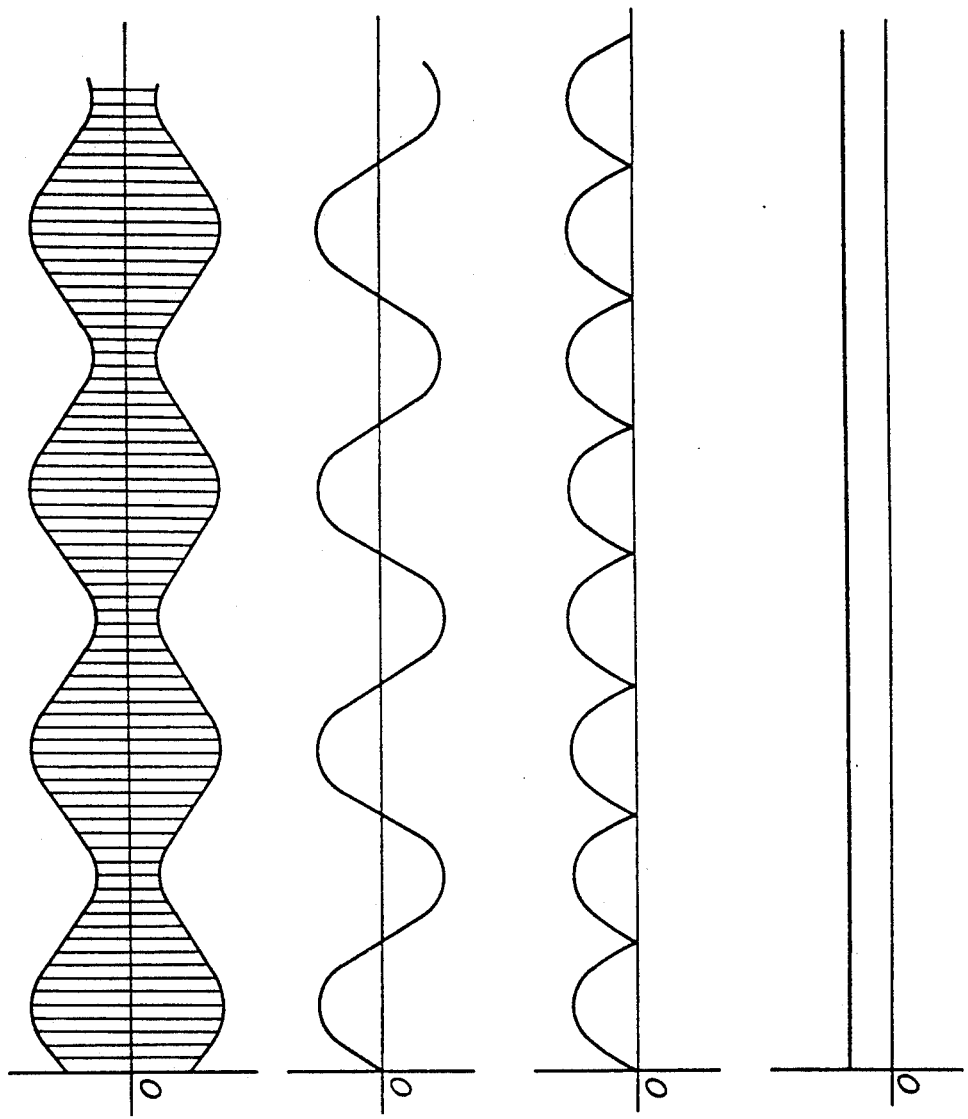
FIGS. 4A-4D are a view indicating the signal waveform of each portion relating to tracking control.

The following is a description of an embodiment of the optical disk relating to the present invention, with reference to FIGS. 1 and 2.

FIG. 1 indicates an embodiment of the optical disk according to the present invention. An optical disk 10 is provided with a central hole 10a through which a rotating shaft passes through the center of. A guide groove is spirally formed around the central hole 10a on a recording surface of the optical disk 10. Then, as is shown in FIG. 2, a recording track $Tr_1$ on which information is recorded is formed adjacent to an edge line 11a of the guide groove 11, and another recording track $Tr_2$ is formed adjacent to another edge line 11b of the guide groove 11.

As indicated in FIG. 2A, the side edge lines 11a and 11b of this guide groove 11 formed in the surface of the optical disk 10 come to have a waveform shape that moves cyclically in the direction of the radius of the optical disk. The distance W between both of the side edge lines 11a and 11b of the optical disk 10 is equal. The side edge lines 11a and 11b of the guide groove 11 are formed so that the frequency and amplitude of the signals obtained via the laser beam irradiated to an edge portion of the guide groove 11 are constant when the optical disk 10 is rotated at a constant linear (periphery) speed with respect to an optical pickup. The frequency of the signals obtained via the laser beam irradiated to an edge portion of the guide groove 11 is, for example, 150 KHz which is 50 times the response frequency of the tracking servo and the focus servo. In addition, in order to reduce the influence of diffraction with respect to the laser beam reflected by the optical disk 10, the depth of the guide groove 11 is determined as one quarter of the wavelength of the laser beam.

The optical disk 10 is simultaneously irradiated with two main laser beams 12 and 13 held within the guide groove 11 as indicated in FIG. 2A. Thus, the recording tracks $Tr_1$ and $Tr_2$ in between the guide groove 11 are recorded or reproduced at the same time. FIG. 2B indicates the relationship between the laser beam energy and the distance from the center of the laser beam spot. For example, recording is performed with respect to the recording track when the laser beam energy exceeds a threshold value $E_{TH}$.

The following is a description of an optical disk apparatus relating to the present invention, with reference to FIG. 3.

Video signal is input to a terminal 20 when information is recorded. The image signal input via this terminal 20 is supplied to a PWM modulator 21. The PWM modulator 21 compares the image signal with a sawtooth waveform and generates PWM modulation signals. This PWM modulation signal is input in parallel to one-half frequency dividers 23 and 24. The one half frequency divider 23 has a T-type flip-flop that is triggered by the fall of the PWM modulation signal and generates a first divided frequency signal. The one half frequency divider 24 has a T-type flip-flop that is triggered by the rise of the PWM modulation signal and generates a second divided frequency signal.

The optical pickup 25 opposes the recording surface of the optical disk 10 and is provided so as to be freely movable in the direction of a radius of the optical disk 10. The optical pickup 25 is provided with two laser diodes (LD) 27a and 27b, laser diode drivers (LDD) 26a and 26b, two photodiodes 30a and 30b and head amplifiers 31a and 31b.

The above first and second divided frequency signals are input to laser diode drivers (LDD) 26a and 26b inside the optical pickup 25. Laser diodes (LD) 27a and 27b are driven by LDD 26a and 26b and generate first and second laser beams of an intensity corresponding to the level of the first and second divided frequencies. Then, these first and second laser beams are irradiated to the surface of the optical disk 10 that is rotating at high speed due to the rotating shaft 28. These laser beams are irradiated to adjacent recording tracks in the direction of a radius of the optical disk 10. This is to say that the first laser beam from a laser diode 27a is irradiated to one of the edge portions of a guide groove 11 and a recording track $Tr_1$ as is the laser beam 12 in FIG. 2, and the second laser beam from the laser diode 27b is irradiated to another edge portion of an guide groove 11 and an recording track $Tr_2$ adjacent to recording track $Tr_1$ as is the laser beam 13 in FIG. 2.

As has been described above, the first and second laser beams are irradiated to the recording surface of the optical disk 10 and the reflected first and second laser beams are irradiated to the photo-diodes 30a and 30b. These first and second reflected beams include a component reflected by the edge portion of the guide groove 11 and a component reflected by the recording tracks $Tr_1$ and $Tr_2$. The photo-diodes 30a and 30b have a photoelectric conversion function and output signals of a level corresponding to the amount of light reflected for the first and second laser beams. The signals output from the photo-diodes 30a and 30b are input to the head amplifiers 31a and 31b and these signals are amplified and the amplified signals are supplied to the band pass filters 32a and 32b and to a synthesis circuit 33.

The signal that is output from each of the head amplifiers 31a and 31b has, as shown in FIG. 4A, waveform for which the signal component of the frequency in the vicinity of 150 KHz corresponding to the edge shape of the guide groove 11, is superimposed on the signal component of the frequency corresponding to the video signal. The signals having this waveform and which are output from the head amplifiers 31a and 31b are input to the band pass filters 32a and 32b. Each of the band pass filters 32a and 32b selectively output only the signals of a predetermined frequency band having the central frequency of 150 KHz. Accordingly, only the signal component having waveform corresponding to the edge shape of the guide groove 11, such as indicated in FIG. 4C for example, is output from each of the band pass filters 32a and 32b. The signals output from the band pass filters 32a and 32b are input to detector circuits 34a and 34b. The detector circuits 34a and 34b perform the full-wave rectification of the output signals from the band pass filters 32a and 32b and the detector circuits 34a and 34b generate signals with a waveform such as indicated in FIG. 4C. Furthermore, the detector circuits 34a and 34b integrate the signal obtained by full-wave rectification and output waveform signal having a DC level as indicated in FIG. 4D. The detection signals from the detector circuits 34a and 34b are input to a differential circuit 35. In order to obtain detect signals from this integration, the frequency of the signal components corresponding to the edge shape of the guide groove 11 is determined so as to be sufficiently larger than the response frequency of the tracking servo.

The following is a description of the tracking control, with reference to FIGS. 5A and 5B.

When spots 40a and 40b of laser beams output from laser diodes 27a and 27b are positioned accurately on a recording track and each laser beam scans as indicated by the broken lines Ia and Ib shown in FIG. 5A, the waveforms of the output signals from the band pass filters 32a and 32b have the same wave height as indicated in column (1) of FIG. 5B. This is because each of the laser beams scans so that the edge portions of the guide groove 11 are the same. (Refer to FIG. 2) When the spots 40a and 40b of the laser beams are positioned outside of the direction of a radius of the optical disk 10 and each of the laser beams scans as indicated by the one dotted chain lines IIa and IIb in FIG. 5A, then the value for the wave height of the signal output from the band pass filter 32a is, as indicated in column (2) of FIG. 5B, smaller than the value of the wave height of the signal output from the band pass filter 32b. This is because the laser beam (spot 40b) from the laser diode 27b scans an edge portion of the guide groove 11 at a portion for which the beam energy is larger than that for the spot (spot 40a) from the laser beam from the laser diode 27a. Furthermore, when the spots 40a and 40b of the laser beams are not positioned in a direction of a radius of the optical disk 10 and each of the laser beams scans as indicated by double dotted chain lines IIIa and IIIb in FIG. 5A, the value for the wave height of the signal output from the band pass filter 32a is larger than the value for the wave height of the signal output from the band pass filter 32b, as indicated in column (3) of FIG. 5B. This is because the spot (spot 40a) of the laser beam from the laser diode 27a scans an edge portion of the guide groove 11 at a position where the beam energy is larger than the spot 40b of the laser beam from the laser diode 27b. The waveform of the signals output from the band pass filters 32a and 32b changes as described above due to the irradiation position of the laser beam and the wave detection signal level from each of the detection circuits 34a and 34b changes. This is to say that when each of the laser beams scan along the broken lines Ia and Ib in FIG. 5A (Refer to column (1) of FIG. 5B), the detection levels from the wave detection circuits 34a and 34b are the same. When each of the laser beams scans as indicated by the one dotted chain lines IIa and IIb in FIG. 5A (Refer to column (2) of FIG. 5B), the detection level from the detection circuit 34a is smaller than the wave detection level from the detection circuit 34b. Furthermore, when each of the laser beams scans as indicated by the double dotted lines IIIa and IIIb indicated in FIG. 5A, the wave detection level from the wave detection circuit 34a is larger than the wave detection level from the wave detection circuit 34b.

The differential circuit 35 differentially amplifies the two detection signals from the detection circuits 34a and 34b and generates tracking error signal. The tracking drive circuit 36 performs position control for the optical pickup 25 in the direction of the radius of the optical disk 10 so that the wave detection signal levels from the wave detection circuits 34a and 34b are the same. This position control of the optical pickup 25 is tracking control. When the wave detection signal levels from each of the waveform detection circuits 34a and 34b are equal, the centers of the laser beam spots 40a and 40b are positioned on the recording track (ontrack).

The synthesis circuit 33 has an exclusive OR circuit. This synthesis circuit 33 performs exclusive logical addition calculations for the first and second reproduction divided frequency signals output from the head amplifiers 31a and 31b when there is reproduction of the information, and reproduces the PWM signal.

The PWM demodulator 38 has, for example, a low pass filter and this PWM demodulator 38 demodulates the reproduction PWM signal into video signals. Then, the demodulated video signal is output to a terminal 39.

In the above described embodiment, the two laser beams are irradiated to adjacent recording tracks $Tr_1$ and $Tr_2$ while at the same time the two laser beams are irradiated to an edge portion of a guide groove 11 formed between recording tracks $Tr_1$ and $Tr_2$. Then, the laser beam that is reflected from the surface of the optical disk 10 is used to perform tracking control for the optical pickup. This is to say that tracking control and the recording and reproduction of information with respect to the recording track are performed at the same time by two laser beams. Accordingly, the structure of the optical pickup can be made more simple and more compact that a conventional optical pickup.

In the embodiment described above, an guide groove 11 is formed in an optical disk 10 so that the distance W between both edge lines 11a and 11b of an guide groove 11 are equal, as indicated in FIG. 6A. The present invention is not limited to this however, as this guide groove can also be formed so that the distance W between both edge lines 14a and 14b changes cyclically as indicated in FIG. 6B. This guide groove indicated in FIG. 6B is formed so that peak $P_c$ of the waveform in one of the edge lines 14a or 14b accurately opposes valley $P_t$ of the waveform in the other of the edge lines 14b or 14a in the direction of the radius of the optical disk 10.

In addition, the guide grooves can be formed in the concentric circular shape on the optical disc.

The present invention is not limited to the embodiments described above, and a person skilled in the art can conceive of other variations and embodiments without departing from the scope of the present invention.

What is claimed is:

1. A rotary recording medium comprising:
a recording surface upon which information is recorded; and a guide track which is a groove formed on said recording surface and having one of a spiral shape and a concentric shape, both edge lines of said groove having a wave shape that changes cyclically in a direction of a radius, and two recording tracks being simultaneously formed adjacent to both the edge lines of said guide track when information is recorded.

2. A rotary recording medium as claimed in claim 1 wherein a distance between both the edge lines of said groove of said guide track are equal.

3. A rotary recording medium as claimed in claim 1 wherein a distance between both the edge lines of said groove of said guide track changes cyclically.

4. A recording and reproducing apparatus for recording and reproducing information on and from a rotary recording medium, said rotary recording medium comprising a recording surface upon which information is recorded, and a guide track which is a groove formed on said recording surface and having one of a spiral and a concentric shape, both edge lines of said groove having a wave shape that changes cyclically in a direction of a radius, said recording and reproducing apparatus comprising:

a first light source irradiating a light beam to said recording surface so that the center of a spot is positioned to one side of said groove in said guide track, a second light source irradiating a light beam to said recording surface so that the center of a spot is positioned to another side of said groove in said guide track, first photoelectric conversion means for receiving a first reflected beam obtained by reflecting said light beam from said first light source on said recording surface and outputting a first signal corresponding to said first reflected beam, second photoelectric conversion means for receiving a second reflected beam obtained by reflecting said light beam from said second light source on said recording surface and outputting a second signal corresponding to said second reflected beam, first signal extraction means for extracting, from said first signal, a signal having a frequency component corresponding to said wave shape of one of the edge lines of said groove, second signal extraction means for extracting, from said second signal, a signal having a frequency component corresponding to said wave shape of the other edge line of said groove, tracking control means for controlling a position, in a direction of said radius, of said first and second light sources so that a central portion of spots of light beams from said first and second light sources is positioned on recording tracks formed on both sides of said guide track, on the basis of each of the signals extracted by said first and second signal extraction means, and means for simultaneously forming said recording tracks for the information on both sides of said guide track at a time of a recording and for simultaneously reproducing the recorded information from said recording tracks at a time of a reproduction.

5. A recording and reproducing apparatus as claimed in claim 4 wherein each of said first signal extraction means and said second signal extraction means has a band pass filter that pass signals of frequency bands including frequency components corresponding to said wave shape of said edge line.

6. A recording and reproduction apparatus as claimed in claim 4 wherein said tracking control means has a first signal conversion means for converting into a direct current signal said signal including a frequency component corresponding to said wave shape of said edge line and from said first signal extraction means, a second signal conversion means for converting into a direct current signal said signal including a frequency component corresponding to said wave shape of said edge line and from said second signal extraction means, said tracking control means controlling a position in the direction of the radius, of said first and second light sources, in accordance with the direct current levels obtained from said first and second signal conversion means.

7. A recording and reproduction apparatus as claimed in claim 6 wherein said tracking control means has an error signal generation means for generating an error signal corresponding to a difference in the levels of the direct current signals from said first and a second signal conversion means, said tracking control means controlling a position in the direction of the radius of said first and second light sources on the basis of said error signal from said error signal generation means.

* * * * *